(12) United States Patent
Eaton et al.

(10) Patent No.: US 6,980,911 B2
(45) Date of Patent: Dec. 27, 2005

(54) AUTOMATIC TRANSFER SWITCH SYSTEM WITH SYNCHRONIZATION CONTROL

(75) Inventors: Zane C. Eaton, Plymouth, WI (US); Kenneth R. Bornemann, Cato, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 10/378,007

(22) Filed: Feb. 28, 2003

(65) Prior Publication Data

US 2004/0172204 A1 Sep. 2, 2004

(51) Int. Cl.$^7$ ............................................. G01R 15/00
(52) U.S. Cl. ......................................... 702/57; 324/96
(58) Field of Search .................. 702/57; 324/96; 307/64; 716/1; 386/95; 455/427; 713/233

(56) References Cited

U.S. PATENT DOCUMENTS

| | | |
|---|---|---|
| 3,794,846 A | 2/1974 | Schlicher et al. |
| 4,249,088 A | 2/1981 | Kleba et al. |
| 4,256,972 A | 3/1981 | Wyatt et al. |
| 4,310,771 A | 1/1982 | Wyatt et al. |
| 4,405,867 A * | 9/1983 | Moakler et al. ............... 307/64 |
| 4,766,327 A | 8/1988 | Fox |
| 5,640,060 A | 6/1997 | Dickson |
| 5,761,073 A | 6/1998 | Dickson |
| 5,784,240 A | 7/1998 | Przywozny |
| 5,959,448 A * | 9/1999 | Baranski et al. ............... 324/96 |
| 6,107,784 A | 8/2000 | Nomiya et al. |
| 6,172,432 B1 | 1/2001 | Schnackenberg et al. |
| 6,191,500 B1 * | 2/2001 | Toy .............................. 307/64 |
| 6,198,176 B1 * | 3/2001 | Gillette ......................... 307/64 |
| 6,255,805 B1 | 7/2001 | Papalia et al. |
| 6,304,468 B2 | 10/2001 | Ichinose et al. |
| 6,630,752 B2 * | 10/2003 | Fleming et al. ............... 307/64 |
| 2004/0172603 A1 * | 9/2004 | Collmeyer et al. ............ 716/1 |

* cited by examiner

*Primary Examiner*—Michael Nghiem
*Assistant Examiner*—Xiuqin Sun
(74) *Attorney, Agent, or Firm*—George E. Haas; Quarles & Brady LLP

(57) ABSTRACT

An automatic transfer switch (ATS) system and method of operating an ATS system to switch between first and second powers received from respective first and second power supplies, are disclosed. In one embodiment, the method includes sensing a first phase associated with the first power and a second phase associated with the second power, and determining whether the first and second phases have failed to become synchronized within a first time period. The method further includes providing a control signal at a second output port when it is determined that the first and second phases have failed to become synchronized within the time period, determining that the first and second phases have become synchronized in response to the control signal, and switching between the first and second powers once it is determined that the first and second phases have become synchronized.

18 Claims, 1 Drawing Sheet

AUTOMATIC TRANSFER SWITCH SYSTEM WITH SYNCHRONIZATION CONTROL

FIELD OF THE INVENTION

The present invention relates to Automatic Transfer Switch (ATS) systems employed to control the coupling of power sources to a load.

BACKGROUND OF THE INVENTION

Automatic Transfer Switch (ATS) systems are widely used to control the delivery of power from two different power sources to a load in a variety of situations, both commercial and residential. For example, a private residence normally receives its electrical power from a utility company. For various reasons, however (e.g., location in a region prone to severe weather), the homeowner can desire a backup source of electrical power, so that comfort or at least habitability of the residence can be maintained during periods in which utility power is unavailable.

Typically, a gasoline, diesel, propane or natural gas internal combustion engine-powered electrical generator, capable of generating three-phase power, is installed in or near the residence, and arranged to be connected to one or more of the electrical circuits in the residence in order to provide the desired backup power. However, one cannot simply leave the backup generator permanently connected, in parallel with the utility power, to the residential electrical circuits. Nor can one simply power up a backup generator and connect it to the residential electrical circuits, without first disconnecting the residential circuits from the power lines coming in from the utility.

To effect the proper switching of the residential electrical circuits or other load from the utility to the backup generator (and eventually back again to the utility), transfer switch systems can be employed. While manual transfer switch systems are available, ATS systems have become popular insofar as an ATS system is able to automatically switch from one power source (e.g., the utility) to another power source (e.g., the backup generator) whenever the system detects that the one power source is not properly providing power, without the intervention of a human operator.

In order for an ATS system to switch between providing power to a load from one AC power source and providing power to the load from a second AC power source, the two AC power sources must be in phase. Conventional ATS systems rely upon the fact that a generator almost never has exactly the same frequency of operation as the utility (which is exactly at 60 Hz). Consequently, it is almost always the case that, if the ATS system waits for a short period of time, the power signals of the two power sources will come into phase with one another for an instant, at which the ATS system can switch between the two power sources.

However, modern generators increasingly operate at frequencies that are almost identical to the exact (60 Hz) frequency of the utilities. Consequently, it may no longer be practical for an ATS system to wait until the generator power signal happens to come into phase with the utility power signal, since this may take an excessively long time. Consequently, conventional ATS systems employed in conjunction with such modern generators may be incapable of providing desired switching between such generators and other power sources in a satisfactory manner.

Therefore it would be advantageous if a new ATS system could be developed that allowed for proper switching between a modern generator and another power source such as a utility in a reasonable amount of time, despite the ability of the modern generator to operate at a frequency nearly identical to that of the utility. It would additionally be advantageous if such a new ATS system was not significantly more complicated in its design than conventional ATS systems and was not significantly more expensive to built or implement than conventional ATS systems.

SUMMARY OF THE INVENTION

The present inventors have recognized that, although modern generators may be better able to maintain a constant speed of operation and thereby better able to maintain a power output having a constant frequency, such generators also typically can be controlled in their speed based upon external control signals. Consequently, the inventors have recognized that it would be possible to design an ATS system to monitor how long it is taking the electrical output of a generator to become synchronized in phase with that of another power source such as a utility, and to output a speed control signal to the generator if the synchronization is taking an excessively long amount of time in order to cause the generator's speed to vary somewhat so that the phase of the generator's power output more rapidly becomes synchronized with that of the other power source.

In particular, the present invention relates to an Automatic Transfer Switch (ATS) system. The ATS system includes at least one input port capable of being coupled to first and second power sources and receiving first and second input powers from those power sources, and a first output port capable of being coupled to a load and providing output power to the load. The ATS system further includes at least one sensing device that is coupled to the at least one input port and senses first and second characteristics of the first and second input powers, respectively, at least one control device coupled to the at least one sensing device that determines whether the first and second phases either have or will become synchronized within a first period, and a second output port coupled to the control device. A control signal generated by the control device is output at the second output port when the control device determines that the first and second phases either have not or will not become synchronized within the first period.

Additionally, the present invention relates to a power supply system. The power supply system includes a generator capable of outputting a generator power at a first frequency and further capable of outputting the generator power at a second frequency upon receiving a control signal. The power supply system further includes an ATS system coupled to the generator. The ATS system includes first and second input ports for receiving the generator power and an additional power, respectively, and a first output port capable of being coupled to a load. The ATS system additionally includes means for determining first and second phases associated with the generator power and the additional power, respectively, and means for switching having at least first and second states. In the first state, the first input port is coupled to the first output port, and in the second state the second input port is coupled to the first output port. The ATS system further includes means for controlling the switching means, for determining when the switching means should switch between the first and second states, and for providing the control signal to the generator when it is determined that operation of the generator at the first frequency is excessively delaying a phase synchronization of the generator power and the additional power.

Further, the present invention relates to a method of switching between a first power received from a first power supply and a second power received from a second power supply as the power to be provided at a first output port capable of being coupled to a load. The method includes sensing a first characteristic associated with the first power and a second characteristic associated with the second power, and determining whether first and second phases associated with the first and second powers, respectively, either have failed or will fail to become synchronized within a first predetermined period of time. The method further includes providing a first control signal at a second output port when it is determined that the first and second phases either have failed or will fail to become synchronized within the first predetermined period of time, determining that the first and second phases either have or will become synchronized following the providing of the first control signal, and switching between the first and second powers when the first and second phases have become synchronized.

DETAILED DESCRIPTION OF THE PREFERRED EMBODIMENT

Figure 1:
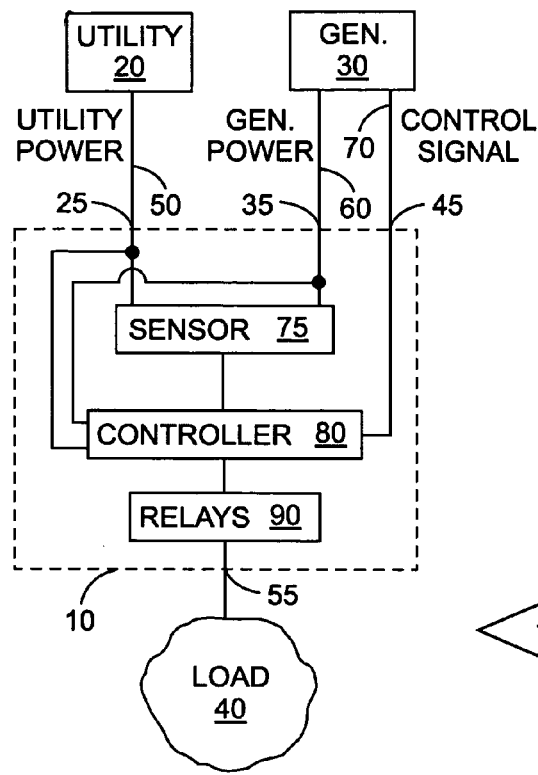
FIG. 1 is a block diagram showing an exemplary system having an Automatic Transfer Switch (ATS) receiving power from first and second power sources and providing power to a load.
Figure 2:
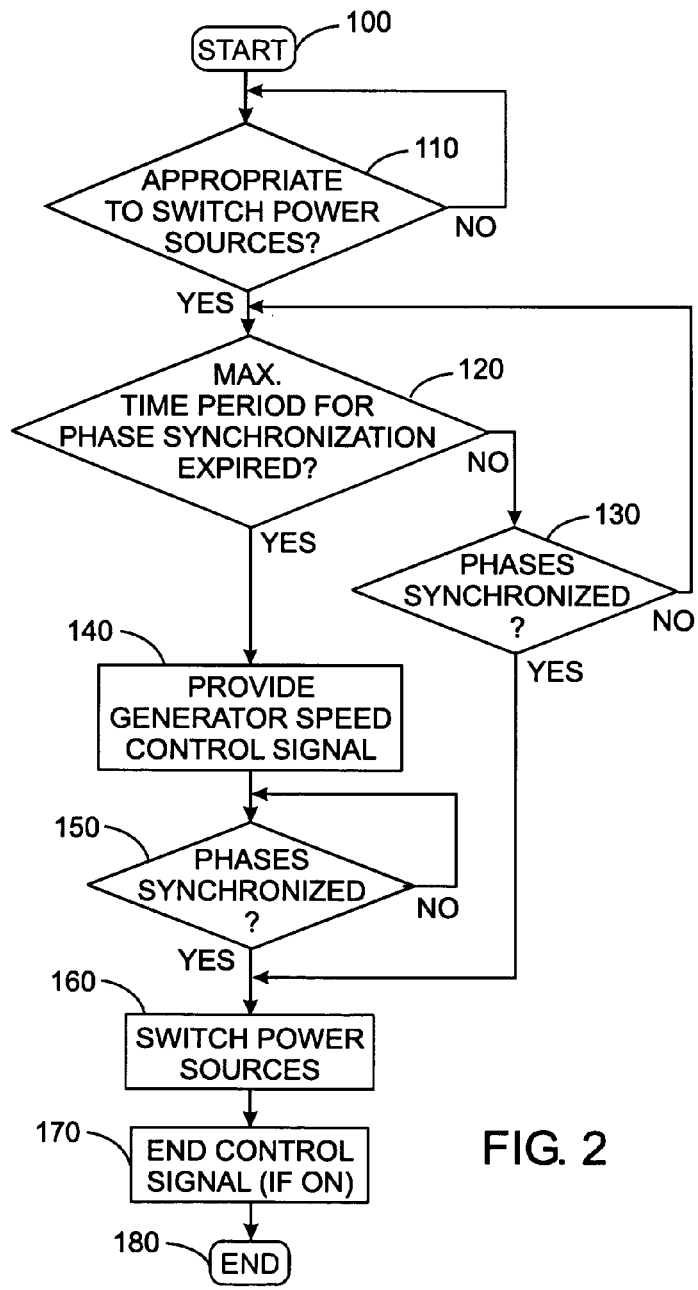
FIG. 2 is a flow chart showing exemplary steps of operation of the ATS of FIG. 1.

Referring to FIGS. 1 and 2, the present feature is an Automatic Transfer Switch (ATS) system 10 that is coupled at least to a first power supply shown to be a utility 20, a second power supply shown to be a generator 30, and a load 40. The utility 20 is coupled to a first input port 25 of the ATS system 10 and capable of supplying utility power 50 to that input port, while the generator 30 is coupled to a second input port 35 of the ATS system and capable of supplying generator power 60 to that input port. The load 40 is coupled to a first output port 55 of the ATS system 10. Typically, although not necessarily, each of the utility power 50 and the generator power 60 is three-phase AC power.

As shown, the generator 30 additionally is in communication with a second output port 45 of the ATS system 10 to allow the ATS system 10 to provide a control signal 70 (or multiple control signals) to the generator. The generator 30 is a modern generator capable of varying its speed, and consequently varying a frequency of the generator power 60 (e.g., a frequency of the voltage output by the generator), in response to the control signal 70.

Internally, the ATS system 10 further includes a sensor 75, an ATS controller 80 and one or more switching components such as relays 90. The power provided at the first and second input ports 25,35 is provided to the relays 90, which are in communication with and controlled by the ATS controller. Based upon the status of the relays 90, either the utility power 50 received at the first port 25 or the generator power 60 received at the second port 35 is communicated to the output port 55 that in turn is coupled to the load 40. Thus, the ATS controller 80 determines whether the load 40 receives power from the utility 20 or the generator 30.

In alternate embodiments the ATS system 10 also can be coupled to additional devices (e.g., a second load or a third power supply), and can include separate input ports for receiving power from each of the power sources or, instead, one or more ports that receive power from two or more power sources. Also, in alternate embodiments, the ATS system 10 could include multiple output ports for providing output power to multiple loads.

Although the input and output ports 25,35, 45 and 55 shown in FIG. 1 are discussed as discrete components, these ports can range in structure from being simply arbitrary points along the various links between the ATS system and the external devices (e.g., the power sources and the load), to more complicated structures existing on the ATS system at which power or communication lines connected to the external devices can be coupled to the ATS system. Further, in certain embodiments, the switching components 90 can be controlled in a manner such that the power provided to the load 40 is a combination of the powers or portions of the powers received from the different power sources.

Further, in alternate embodiments, the power supplies 20,30 need not be the types of power supplies shown; for example, the utility 20 could be replaced with a different type of power supply such as an additional generator. However, at least one of the power supplies is capable of receiving one or more control signal(s) and adjusting a frequency of its output signal in response to the control signal(s).

As shown in FIG. 1, the sensor 75 is coupled to the utility power 50 and the generator power 60 and senses or otherwise determines certain characteristics of those powers that allow for a determination of the phases of those powers. In certain embodiments, the sensed information may be information concerning the voltage of a single phase of each of the three-phase voltages provided at the first and second input ports 25,35, which can in turn be used to determine the relative phase of the two powers. For example, if two or more successive zero-crossings of the respective voltages are sensed, then it is to some extent possible to predict the phases of those voltages at future times and, in particular, possible to predict the times at which one or more successive zero-crossings of the voltages will occur. In alternate embodiments, the sensor 75 can be any type of sensor known in the art that is capable of detecting phase or other information upon which phase can be determined, such as various analog or digital phase detectors known in the art.

As shown in FIG. 1, the sensor 75 is coupled to the ATS controller 80 and provides the ATS controller with the sensed phase information (e.g., zero-crossing information), or at least with information upon which phase can be determined, calculated or predicted. The ATS controller 80 can be any of a variety of different types of control mechanisms including hardwired circuitry, a microprocessor, a programmable logic device, a programmable logic array, or other types of control mechanisms. In embodiments where the information provided by the sensor 75 is not directly indicative of phase, the ATS controller 80 can perform one or more calculations or other operations to determine desired phase information.

When the ATS controller 80 is attempting to switch between the utility 20 and the generator 30, the ATS controller 80 measures or otherwise determines or predicts the time it takes (or will take) for the powers 50,60 to come into phase. If a predetermined time period (for example, one minute) expires before the powers 50,60 have come into phase, or it is determined that it will take more than such a period for the powers to come into phase, the ATS controller 80 outputs the control signal 70 at the second output port 45 to that one of the power sources that is adjustable in terms of its frequency of operation, in this case the generator 30.

In one embodiment, the control signal 70 is configured so that it causes the generator 30 to slow down (or speed up), such that its frequency of operation becomes different from that of the utility 20. Consequently, within a short time, the two powers 50,60 come into phase with one another (at least instantaneously, such that the phases of each of the powers are identical, e.g., where voltages of both powers experience a zero crossing simultaneously) and the ATS system 10 can then switch between them. Once the ATS system 10 has switched between the two powers 50,60, the ATS system then stops providing the control signal 70 to the generator 30, and the generator then returns to its normal operating speed.

FIG. 2 shows in greater detail exemplary steps of operation of the ATS controller 80. Specifically, upon starting operation at step 100, the ATS controller 80 first awaits a time or circumstance at which it is appropriate for a switch between powers 50,60 provided by the utility 20 and the generator 30 to be performed, for example, a circumstance giving rise to an expectation that a fault in the utility power 50 may occur, or when necessary during peak-shaving operation or during a test of one of the power sources (e.g., the generator 30).

Once it is appropriate for a switch to occur between the two powers 50,60, the ATS controller 80 proceeds to step 120, at which the ATS controller waits for up to a predetermined maximum period of time for the powers 50,60 to become synchronized in phase with one another. So long as the powers 50,60 have not become synchronized but the predetermined time period has not yet expired, the ATS controller 80 continues to cycle between step 120 and step 130, at which the ATS controller 80 determines whether the powers 50,60 have become synchronized in phase.

If the powers 50,60 become synchronized in phase before the passing of the predetermined period of time, the ATS controller 80 proceeds to step 160, at which the ATS controller 80 proceeds to cause the ATS system 10 to switch between the utility power and the generator power. This is typically achieved by causing one or more relays (not shown) to switch within the ATS system 10. Because typically the switching time of the relays 90 is not instantaneous but rather takes a finite amount of time (e.g., 50 milliseconds), the switching process is executed so that the switching is completed at the time at which phase alignment (e.g., simultaneous zero crossings) is expected to occur. Upon causing the appropriate switch either from the utility 20 to the generator 30 or vice-versa (depending upon the circumstance), the procedure is completed at step 180.

However, if the powers 50,60 do not become synchronized in phase within the predetermined time period, the ATS controller 80 proceeds instead from step 120 to step 140, at which the ATS controller outputs the control signal 70 to the generator 30. The control signal 70 can take a variety of forms including, for example, simply a high-voltage level signal. Then, at step 150, the ATS controller 80 monitors whether the generator power 60 has become synchronized in phase with the utility power 50. The ATS controller 80 continues to monitor the relative phases of the powers 50,60 at step 150 (and continues to provide the control signal 70) until the phases have become synchronized.

Then, once synchronization of the phases has occurred, the ATS controller 80 proceeds to step 160, at which the ATS controller causes the switching between the powers 50,60. Once the switching has occurred, the ATS controller 80 further proceeds to step 170, at which the control signal 70 is turned off, allowing the generator 30 to return to its normal operating speed such that the generator power 60 returns to its normal frequency of operation, and then the procedure is completed at step 180.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. An Automatic Transfer Switch (ATS) system comprising:
   at least one input port capable of being coupled to first and second power sources and receiving first and second input powers from those power sources;
   a first output port capable of being coupled to a load and providing output power to the load;
   at least one sensing device that is coupled to the at least one input port and senses first and second characteristics of the first and second input powers, respectively;
   at least one control device coupled to the at least one sensing device that determines whether a first phase of the first input power and a second phase of the second input power either have or will become synchronized within a first period; and
   a second output port coupled to the control device, wherein a control signal generated by the control device is output at the second output port when the control device determines that the first and second phases either have not or will not become synchronized within the first period;
   wherein the control signal is configured to cause a change in operation of at least one of the first and second power sources so that at least one of the first and second phases is adjusted in a manner that could lead to synchronization of the first and second phases, and the control signal is a high-level signal, which is intended to precipitate a change in an output frequency of one of the power sources.

2. The ATS system of claim 1, wherein the sensing device is selected from the group consisting of:
   an analog phase sensor; and
   a voltage sensor capable of detecting zero-crossings of first and second voltages of the first and second powers, respectively.

3. The ATS system of claim 1, wherein the at least one control device is one of a microprocessor, a hard-wired control device, and a programmable logic device.

4. The ATS system of claim 1, further comprising:
   at least one switching component having at least first and second states, wherein when the switching component is in the first state, the first input power is communicated to the first output port, and wherein when the switching component is in the second state, the second input power is communicated to the first output port.

5. The ATS system of claim 4, wherein the at least one switching component includes at least one relay.

6. The ATS system of claim 4, wherein the at least one switching component is coupled to, and the state of the at least one switching component is controlled by, the at least one control device.

7. The ATS system of claim 4, wherein the control device causes the at least one switching component to switch when it is determined that a circumstance appropriate for switching has occurred and it is further determined that the phases of the first and second power sources are synchronized.

8. The ATS system of claim 7, wherein the circumstance appropriate for switching occurs when at least one of peak-shaving is being performed, testing of a generator is being performed, and a circumstance has occurred indicating that a fault may occur.

9. The ATS system of claim 7, wherein the switching of the switching component causes the first input port to be electrically coupled to the first output port when the second input port was previously electrically coupled to the first output port, and causes the second input port to be electrically coupled to the first output port when the first output port was previously electrically coupled to the first output port.

10. The ATS system of claim 1, wherein each of the first and second characteristics concern the phases of respective output voltage levels received at the first and second input ports.

11. A power supply system comprising:
   a generator capable of outputting a generator power at a first frequency and further capable of outputting the generator power at a second frequency upon receiving a control signal; and
   an ATS system coupled to the generator and including first and second input ports for receiving the generator power and an additional power, respectively, and a first output port capable of being coupled to a load;
   means for determining first and second phases associated with the generator power and the additional power, respectively;
   means for switching having at least first and second states, wherein in the first state the first input port is coupled to the first output port, and in the second state the second input port is coupled to the first output port; and
   means for controlling the switching means, for determining when the switching means should switch between the first and second states, and for providing the control signal to the generator when it is determined that operation of the generator at the first frequency is excessively delaying a phase synchronization of the generator power and the additional power, wherein the control signal can take on a variety of values, each of which is intended to precipitate a respective change operation of the generator to the second frequency.

12. The power supply of claim 11, wherein the means for controlling provides the control signal to the generator when it is determined that the phases of the generator power and the additional power have not become synchronized within a first period, and the means for controlling discontinues the control signal after the generator power and the additional power have become synchronized in phase.

13. A method of switching between a first power received from a first power supply and a second power received from a second power supply as the power to be provided at a first output port capable of being coupled to a load, the method comprising:
   sensing a first characteristic associated with the first power and a second characteristic associated with the second power;
   determining whether first and second phases associated with the first and second powers, respectively, either have failed or will fail to become synchronized within a first predetermined period of time;
   providing a first control signal at a second output port when it is determined that the first and second phases either have failed or will fail to become synchronized within the first predetermined period of time, wherein the first control signal can take on a variety of values, each of which is intended to precipitate a respective change in an output frequency of the second power supply;
   the first control signal is a voltage signal configured for reception by the second power supply to control an output frequency of the second power
   determining that the first and second phases either have or will become synchronized following the providing of the first control signal; and
   switching between the first and second powers when the first and second phases have become synchronized.

14. The method of claim 13, further comprising ceasing the providing of the first control signal following the switching between the first and second powers.

15. The method of claim 13, wherein the second output port is capable of being coupled to the second power supply, and the first control signal is a voltage signal configured for reception by the second power supply to control an output frequency of the second power.

16. The method of claim 13, wherein the switching occurs while at least one of peak-shaving is being performed, testing of a generator is being performed, and a circumstance has occurred indicating that a fault is expected.

17. The method of claim 13, wherein the first and second characteristics are the phases of output voltages associated with the first and second powers, respectively.

18. The method of claim 13, further comprising switching back to an original one of the first and second power supplies when it is determined that the respective power is no longer experiencing a fault.

* * * * *